US012523237B2

(12) United States Patent
Shimizu et al.

(10) Patent No.: US 12,523,237 B2
(45) Date of Patent: Jan. 13, 2026

(54) TiAl ALLOY IMPELLER

(71) Applicant: KABUSHIKI KAISHA TOYOTA JIDOSHOKKI, Kariya (JP)

(72) Inventors: Tatsuya Shimizu, Kariya (JP); Masahiro Aono, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 0 days.

(21) Appl. No.: 18/845,236

(22) PCT Filed: Mar. 17, 2022

(86) PCT No.: PCT/JP2022/012183
§ 371 (c)(1),
(2) Date: Sep. 9, 2024

(87) PCT Pub. No.: WO2023/175822
PCT Pub. Date: Sep. 21, 2023

(65) Prior Publication Data

US 2025/0215889 A1 Jul. 3, 2025

(51) Int. Cl.
*C22C 14/00* (2006.01)
*F04D 29/30* (2006.01)

(52) U.S. Cl.
CPC .............. *F04D 29/30* (2013.01); *C22C 14/00* (2013.01); *F05D 2200/13* (2013.01); (Continued)

(58) Field of Classification Search
CPC ........ F04D 29/30; F04D 29/32; F04D 29/321; F04D 29/24; F04D 29/242; F04D 29/284; C22C 14/00; C22C 21/00; F05D 2300/182
See application file for complete search history.

(56) References Cited

U.S. PATENT DOCUMENTS 6,588,485 B1 7/2003 Decker
2017/0167497 A1* 6/2017 Schall .................... C22F 1/183
(Continued)

FOREIGN PATENT DOCUMENTS

DE 102008000539 A1 9/2009
JP 2004-052754 A 2/2004
(Continued)

OTHER PUBLICATIONS

International Search Report of PCT/JP2022/012183 dated May 10, 2022 [PCT/ISA/210].

*Primary Examiner* — Nathaniel E Wiehe
*Assistant Examiner* — Maxime M Adjagbe
(74) *Attorney, Agent, or Firm* — Sughrue Mion, PLLC

(57) ABSTRACT

A TiAl alloy impeller is composed of a TiAl alloy and is mountable on a vehicle turbocharger. The TiAl alloy has a lamellar structure in which an $\alpha_2$ layer containing $Ti_3Al$ and a $\gamma$ layer containing TiAl are alternately stacked. The TiAl alloy impeller includes a shaft portion and blades, each of the blades includes an outer edge, and a region of each of the blades including the outer edge has a processed surface. The processed surface is provided with one or more grooves. At least one of the grooves satisfies a relation of $D_g > 2 \times R_g$ or $D_g > W_g$, where $D_g$ represents a depth of the groove and $R_g$ represents a curvature radius of the groove at a bottom surface of the groove or $W_g$ represents a width of the groove. Thus, a TiAl alloy impeller having high performance as an impeller is provided.

9 Claims, 7 Drawing Sheets

(52) U.S. Cl.
CPC ...... *F05D 2220/40* (2013.01); *F05D 2240/30* (2013.01); *F05D 2300/182* (2013.01)

(56) References Cited

U.S. PATENT DOCUMENTS

| | | | | |
|---|---|---|---|---|
| 2019/0368006 | A1* | 12/2019 | Koyanagi ............ | B22D 21/005 |
| 2022/0003122 | A1 | 1/2022 | Shimizu | |

FOREIGN PATENT DOCUMENTS

| | | | | |
|---|---|---|---|---|
| JP | 2017155268 | A | * | 9/2017 |
| JP | 2019-210502 | A | | 12/2019 |
| JP | 2020-079577 | A | | 5/2020 |

* cited by examiner

TiAl ALLOY IMPELLER

CROSS REFERENCE TO RELATED APPLICATIONS

This application is a National Stage of International Application No. PCT/JP2022/012183 filed on Mar. 17, 2022.

TECHNICAL FIELD

The present disclosure relates to a TiAl alloy impeller.

BACKGROUND ART

For example, Japanese Patent Laying-Open No. 2004-52754 (hereinafter referred to as "PTL 1") discloses a method of manufacturing a titanium impeller for a turbocharger by a hybrid method including two steps, i.e., a casting step and a processing step through cutting.

CITATION LIST

Patent Literature

PTL 1: Japanese Patent Laying-Open No. 2004-52754

SUMMARY

Technical Problem

In general, in an impeller such as a turbine wheel used in a supercharger, an outer edge of the impeller in a radial direction of the impeller is formed to be thinnest in order to increase efficiency. Meanwhile, when a TiAl (titanium-aluminum) alloy having a higher strength than Ti (titanium) used in PTL 1 is selected as a material of an impeller to manufacture an impeller having a blade corresponding to a required shape, a problem such as chipping occurs at an outer edge of the blade of the cast product to result in decreased yield disadvantageously because the TiAl alloy has a high melting point and a high viscosity. When the thickness of the outer edge of the blade of the cast product is increased in order to suppress such a problem, performance (for example, exhaust efficiency, fuel efficiency, or the like, and the same applies to the description below) thereof as an impeller is decreased disadvantageously.

Thus, the present disclosure has an object to solve the above-described problems so as to provide a TiAl alloy impeller having high performance as an impeller.

Solution to Problem

According to an aspect, the present disclosure is directed to a TiAl alloy impeller composed of a TiAl alloy and mountable on a vehicle turbocharger. The TiAl alloy impeller includes a shaft portion and a plurality of blades connected to the shaft portion. Each of the blades includes an outer edge that is an edge on an outer side in a radial direction of the shaft portion, and a region of each of the blades including the outer edge has a processed surface. The processed surface is provided with one or more holes. At least one of the holes satisfies a relation of $D_h \leq 2 \times R_h$, where $D_h$ represents a depth of the hole and $R_h$ represents a curvature radius of the hole at a bottom surface of the hole. In the TiAl alloy impeller according to the present aspect, a foreign matter (specifically, a fine particle such as a dust particle, and the same applies to the description below) in exhaust gas is retained in the hole of the processed surface to make the processed surface smooth, thus resulting in high performance as an impeller.

According to another aspect, the present disclosure is directed to a TiAl alloy impeller composed of a TiAl alloy and mountable on a vehicle turbocharger. The TiAl alloy has a lamellar structure in which an $\alpha_2$ layer containing $Ti_3Al$ and a $\gamma$ layer containing TiAl are alternately stacked. The TiAl alloy impeller includes a shaft portion and a plurality of blades connected to the shaft portion. Each of the blades includes an outer edge that is an edge on an outer side in a radial direction of the shaft portion, and a region of each of the blades including the outer edge has a processed surface. The processed surface is provided with one or more grooves. At least one of the grooves satisfies a relation of $D_g > 2 \times R_g$ or $D_g > W_g$, where $D_g$ represents a depth of the groove and $R_g$ represents a curvature radius of the groove at a bottom surface of the groove or $W_g$ represents a width of the groove. In the TiAl alloy impeller according to this aspect, a foreign matter in exhaust gas is retained in the groove of the processed surface to make the processed surface smooth, thus resulting in high performance as an impeller.

According to still another aspect, the present disclosure is directed to a TiAl alloy impeller composed of a TiAl alloy and mountable on a vehicle turbocharger. The TiAl alloy has a lamellar structure in which an $\alpha_2$ layer containing $Ti_3Al$ and a $\gamma$ layer containing TiAl are alternately stacked. The TiAl alloy impeller includes a shaft portion and a plurality of blades connected to the shaft portion. Each of the blades includes an outer edge that is an edge on an outer side in a radial direction of the shaft portion, and a region of each of the blades including the outer edge has a processed surface. The processed surface is provided with one or more holes and one or more grooves. At least one of the holes satisfies a relation of $D_h \leq 2 \times R_h$, where $D_h$ represents a depth of the hole and $R_h$ represents a curvature radius of the hole at a bottom surface of the hole. At least one of the grooves satisfies a relation of $D_g > 2 \times R_g$ or $D_g > W_g$, where $D_g$ represents a depth of the groove and $R_g$ represents a curvature radius of the groove at a bottom surface of the groove or $W_g$ represents a width of the groove. In the TiAl alloy impeller according to this aspect, foreign matters in exhaust gas are retained in the hole and groove of the processed surface to make the processed surface smoother, thus resulting in higher performance as an impeller.

Advantageous Effects

As described above, according to the present disclosure, a TiAl alloy impeller having high performance as an impeller can be provided.

DESCRIPTION OF EMBODIMENTS

Figure 1:
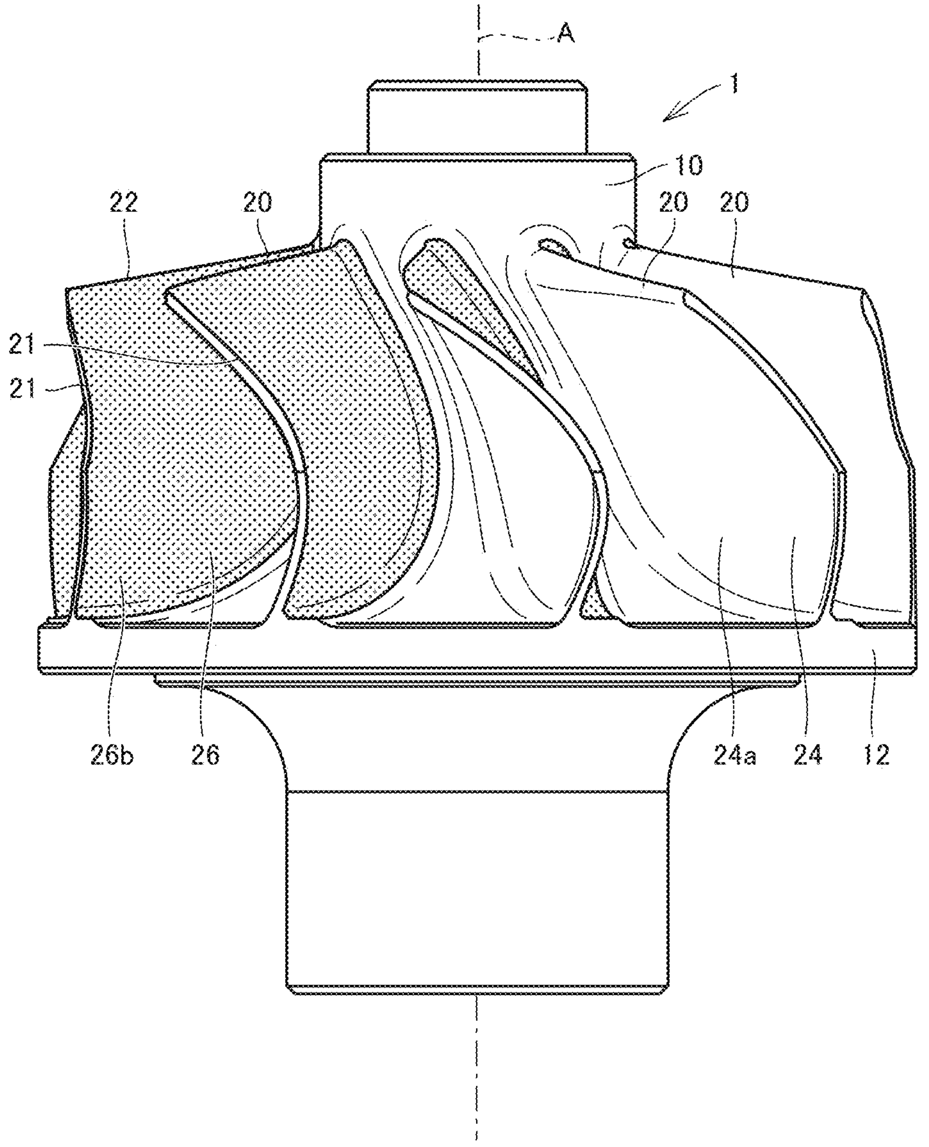
FIG. 1 is a side view showing a certain exemplary TiAl alloy impeller according to the present disclosure.

Embodiments of the present disclosure will be described with reference to figures. It should be noted that in each of the figures below, the same or corresponding portions are denoted by the same reference characters.

First Embodiment

Figure 2:
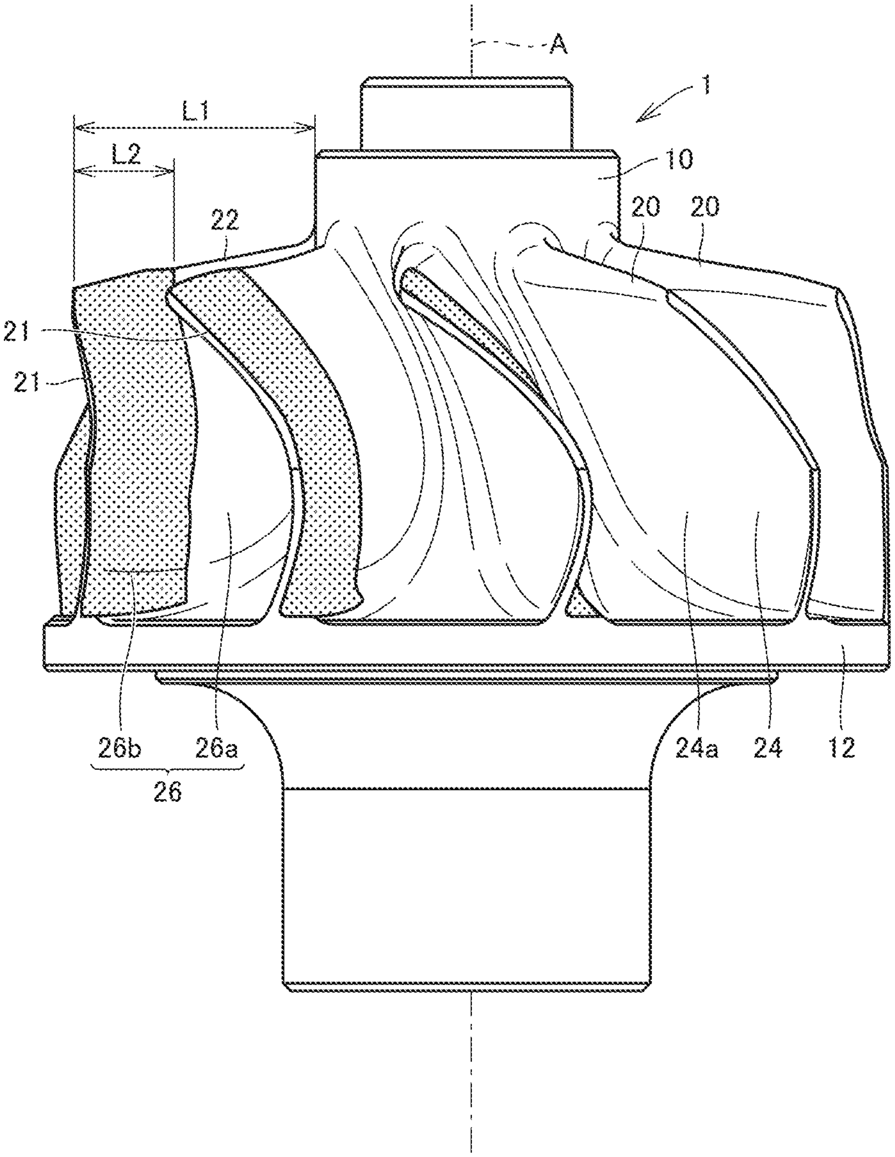
FIG. 2 is a side view showing another exemplary TiAl alloy impeller according to the present disclosure.

Referring to FIGS. 1 and 2, a TiAl alloy impeller 1 according to a first embodiment is composed of a TiAl alloy and is mountable on a vehicle turbocharger. As shown in FIGS. 1 and 2, the TiAl alloy impeller 1 according to the first embodiment specifically includes a shaft portion 10 and a plurality of blades 20 connected to the shaft portion 10. The shaft portion 10 and the plurality of blades 20 are formed in one piece.

(Shaft Portion)

The shaft portion 10 is rotatable about a rotation axis A. The shaft portion 10 has a shape gradually increased in diameter from one side (upper side in FIGS. 1 and 2) toward the other side (lower side in FIGS. 1 and 2) in the rotation axis direction. A disc portion 12 formed to have a disc shape is connected to an end portion of the shaft portion 10 on the other side.

(Blades)

Each of the blades 20 is connected to the shaft portion 10. Each of the blades 20 has a shape curved to protrude toward one side in a peripheral direction of the shaft portion 10. A surface of each blade 20 on the one side is a recessed surface 24 that is recessed to protrude in the peripheral direction of the shaft portion 10. A surface of each blade 20 on the other side is a protruding surface 26 that bulges to protrude in the peripheral direction of the shaft portion 10. Each of the blades 20 has an outer edge 21 and a one-side edge 22. The outer edge 21 is an edge of each blade 20 on an outer side in a radial direction of the shaft portion 10. The one-side edge 22 is an edge of each blade 20 on the one side (upper side in FIGS. 1 and 2) in the axis direction of the shaft portion 10. A region of each of the blades 20 including the outer edge 21 has a processed surface 26*b*.

(Processed Surface)

The processed surface 26*b* is formed at the region of each of the blades 20 including the outer edge 21. Here, it is sufficient that the region of each of the blades 20 including the outer edge 21 is a region including the outer edge(s) of the recessed surface 24 and/or the protruding surface 26, and the region of each of the blades 20 including the outer edge 21 may be a whole or part of the recessed surface 24 and/or the protruding surface 26. For example, FIG. 1 shows a case where the processed surface 26*b* is formed in a whole of the protruding surface 26 including the outer edge 21 and a whole of the recessed surface 24 is a cast surface 24*a* that has not been processed. On the other hand, FIG. 2 shows a case where the processed surface 26*b* is formed in a part (region of the protruding surface 26 with a radial length L2 from the outer edge 21 within a radial length L1 of each blade 20) of the protruding surface 26 including the outer edge 21 and the other part of the protruding surface and a whole of the recessed surface 24 are cast surfaces 26*a*, 24*a* that each have not been processed. Here, in the first embodiment, the processing for forming the processed surface 26*b* means cutting or electrolytic processing, and the electrolytic processing is preferable from the viewpoint of improving performance as an impeller as described later.

(Hole)

Further, referring to FIGS. 3 and 4A to 4C, the processed surface 26*b* is provided with one or more holes. That is, the one or more holes 30 are formed in the processed surface 26*b*. Each of the holes 30 is originated from a pore called "gas cavity" provided in surface and inner portion of a shaped material formed through casting, precision casting (lost wax precision casting), forging, metal injection molding (MIM), laser metal deposition (LMD), sintering, or the like for a TiAl alloy. The hole 30 is formed in the processed surface 26*b* by performing the electrolytic processing or cutting onto a surface of such a shaped material. In the TiAl alloy impeller t according to the first embodiment, at the time of exhaustion of gas, foreign matters in the exhaust gas are retained in the one or more holes 30 formed in the processed surface 26*b* to make the processed surface 26*b* smooth, thereby improving the exhaust efficiency, the fuel efficiency, and the like.

Figure 4A:
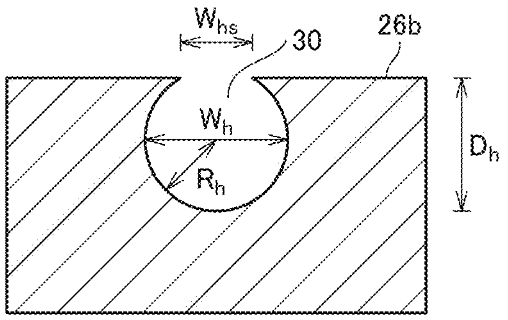
FIG. 4A is a schematic view showing an exemplary cross section of a certain hole existing in a certain processed surface of the TiAl alloy impeller according to the present disclosure, the certain processed surface being formed by electrolytic processing.
Figure 4B:
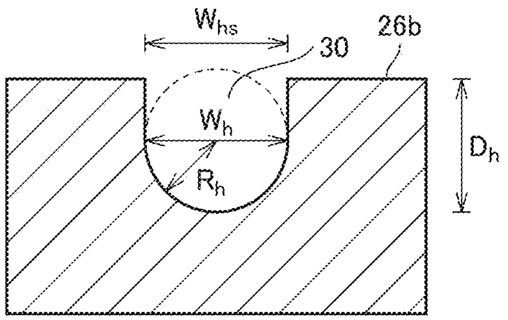
FIG. 4B is a schematic view showing an exemplary cross section of a certain hole existing in a certain processed surface of the TiAl alloy impeller according to the present disclosure, the certain processed surface being formed by cutting or electrolytic processing.
Figure 4C:
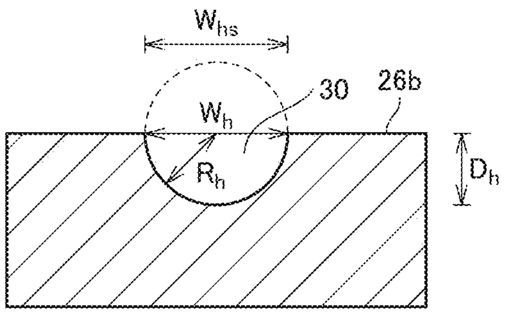
FIG. 4C is a schematic view showing an exemplary cross section of a certain hole existing in a certain processed surface of the TiAl alloy impeller according to the present disclosure, the certain processed surface being formed by cutting.

Due to the above-described origin of each of the holes 30, the shape of the hole 30 is a shape including at least a part of a substantial sphere, and has a cross sectional shape as shown in each of FIGS. 4A to 4C, for example. The cross sectional shape of the bole 30 as shown in FIG. 4A is a shape seen only in the case of the electrolytic processing, and includes only a part (substantially circular arc) of a substantial circle. Referring to FIG. 4A, when an electrolytic processing liquid enters the above-described gas cavity due to the electrolytic processing, the entire surface of the gas cavity is uniformly etched together with the processed surface 26*b*, thereby forming the hole 30 having a diameter $W_h$ larger than a diameter (hereinafter, referred to as a "processed-surface diameter $W_{hs}$") of the hole 30 in the processed surface 26*b* (the diameter $W_h$ of the hole is defined as a value twice as large as a curvature radius $R_h$ of the hole at a bottom surface of the hole ($2\times R_h$) as described below), i.e., thereby forming the hole 30 satisfying a relation of $W_{hs} \leq W_h$. The cross sectional shape of the hole 30 as shown in FIG. 4B is a shape mainly seen in the case of the cutting, but is also occasionally seen in the case of the electrolytic processing, and includes not only the part (substantially circular arc) of the substantial circle but also substantially parallel portions in the vicinity of the surface. The substantially parallel portions in the vicinity of the surface are considered to be caused by chipping of the brittle TiAl alloy in the case of the cutting, and are considered to be caused by the etching being promoted in the vicinity of the surface due to flow of the electrolytic liquid or the like in the case of the electrolytic processing. The cross sectional shape of the hole 30 as shown in FIG. 4C is a shape seen only in the case of the cutting, and includes only the part (substantially circular arc) of the substantially circle. In the case of the cutting, the surface of the gas cavity is not cut and only the processed surface 26*b* is cut, and the hole 30 having the cross sectional shape of FIG. 4A is not obtained due to occurrence of chipping of the TiAl alloy in the vicinity of the processed surface 26*b*, with the result that only the hole 30 having the cross sectional shape of FIG. 4B or 4C is obtained.

At least one of the holes 30 (preferably at least half of the holes 30, and more preferably all of the boles 30) satisfies a relation of $D_h \leq 2\times R_h$, where $D_h$ represents a depth of the hole 30 and $R_h$ represents a curvature radius of the hole 30 at the bottom surface of the hole 30 (see FIGS. 4A to 4C). Here, the depth $D_h$ of the hole 30 means a distance from a surface of a non-hole portion of the processed surface 26*b* to the deepest portion of the bole 30, and is measured by CT scan, a microscope, an SEM (scanning electron microscope), or the like. Further, the curvature radios $R_h$ of the bole 30 at the bottom surface of the hole 30 is measured by CT scan, a microscope, an SEM, or the like, assuming that the curvature radius $R_h$ is equal to the radius of an equivalent-volume sphere tangential to the bottom surface of the hole 30 and is equal to the radius of an equivalent-area circle tangential to a curve representing the bottom surface of the hole 30 in a cross section extending through the center of the hole 30. Here, since the surface of the non-hole portion is mainly cut in the case of the cutting, the depths $D_h$ of the holes formed by the cutting are varied in a range of $0 \leq D_h \leq 2\times R_h$, and the average of the depths $D_h$ becomes equal to $R_h$ (see FIG. 4C). On the other hand, in the case of the electrolytic processing, not only the surface of the non-hole portion but also the surface of the hole 30 are etched at substantially the same rate. Hence, the depth $D_h$ of each of the holes 30 formed by the electrolytic processing never becomes larger than $2\times R_h$, but is close to $2\times R_h$, and hardly becomes $R_h$ or less. Thus, at least one of the holes 30 (preferably at least half of the boles 30, and more preferably all of the holes 30) falls within the range of $R_h \leq D_h \leq 2\times R_h$, and preferably falls within the range of $1.5\times R_h \leq D_h \leq 2\times R_h$ and more preferably falls within the range of $1.75\times R_h \leq D_h \leq 2\times R_h$ under the same electrolytic processing conditions (see FIGS. 4A and 4B). Therefore, since a ratio of the depth $D_h$ to the curvature radius $R_h$ is larger in the bole formed by the electrolytic processing than that in the hole formed by the cutting, foreign matters in the exhaust gas can be more readily retained therein, thereby further improving the exhaust efficiency, the fuel efficiency, and the like.

The average diameter of the holes 30 is not particularly limited, but is preferably 500 μm or less because such holes are readily obtained by the process of formation of the holes. From the viewpoint of retaining a large amount of fine foreign matters, the average diameter is more preferably 0.1 μm or more, and is further preferably 1 μm or more. From the viewpoint of retaining a large amount of foreign matters without missing out fine foreign matters, the average diameter is more preferably 250 μm or less, and is further preferably 150 μm or less. Here, the diameter $W_h$ of each of the holes 30 means a value twice as large as the curvature radius $R_h$ of the hole 30, i.e., $2\times R_h$. However, in the case of a hole 30 having a depth $D_h$ smaller than its curvature radios $R_h$, since the hole 30 does not have a diameter of $2\times R_h$ and the processed-surface diameter $W_{hs}$ is the maximum diameter, the processed-surface diameter $W_{hs}$ is regarded as the diameter of the hole 30. Further, the average diameter of the holes 30 means an average of the diameters of the holes, means an average of the diameters of the holes when the number of the holes is 1 to 10, and means an average of the diameters of freely selected 10 holes when the number of the holes are more than 10.

(Manufacturing Method)

Figure 8:
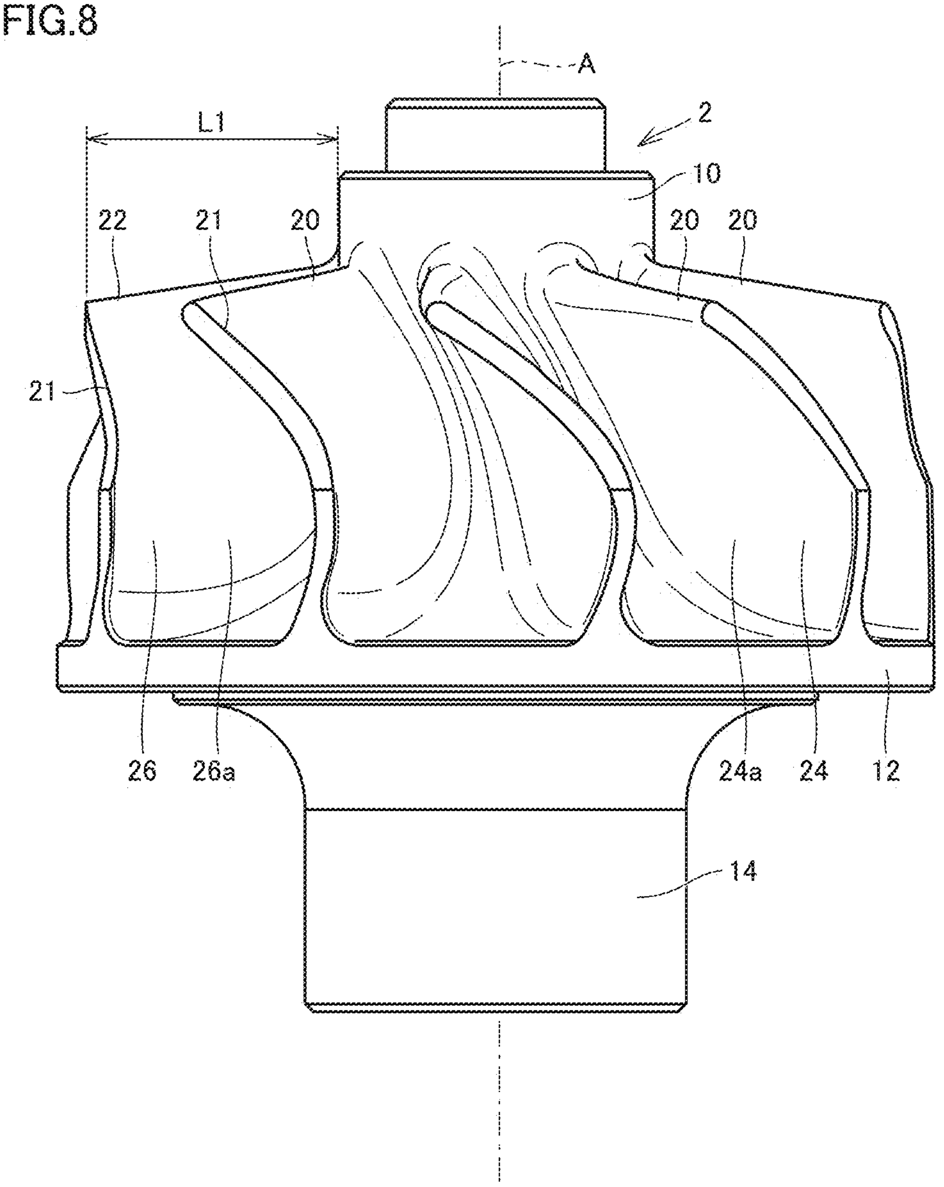
FIG. 8 is a side view showing an exemplary shaped material for the TiAl alloy impeller according to the present disclosure.

Referring to FIGS. 1, 2, and 8, the TiAl alloy impeller 1 according to the first embodiment is obtained by performing the cutting or electrolytic processing onto the region of the blade 20 including the outer edge 21 in the shaped material 2 having its surface and inner portion provided with the pores. Here, from the viewpoint of further improving the exhaust efficiency, the fuel consumption, and the like, the electrolytic processing is preferable because foreign matters in the exhaust gas can be more readily retained therein by increasing the ratio of the depth $D_h$ to the curvature radius $R_h$ with the relation between the depth $D_h$ of the hole 30 and the curvature radius $R_h$ of the hole 30 at the bottom surface of the hole 30 being in the range of $1.75\times R_h \leq D_h \leq 2\times R_h$ as described above.

Second Embodiment

Referring to FIGS. 1 and 2, as with the TiAl alloy impeller according to the first embodiment, a TiAl alloy impeller 1 according to a second embodiment is composed of a TiAl alloy and is mountable on a vehicle turbocharger, specifically includes a shaft portion 10 and a plurality of blades 20 connected to the shaft portion 10, and the shaft portion 10 and the plurality of blades 20 are formed in one piece. Further, as with the Ti alloy impeller according to the first embodiment, each of the blades 20 of the TiAl alloy impeller according to the second embodiment includes an outer edge 21 that is an edge on an outer side in the radial direction of the shaft portion 10, and a region of each of the blades 20 including the outer edge 21 has a processed surface 26*b*. Thus, the shaft portion 10, the blades 20, and the processed surface 26*b* in the TiAl alloy impeller according to the second embodiment are the same as the shaft portion 10, the blades 20, and the processed surface 26*b* in the TiAl alloy impeller according to the first embodiment, and therefore will not be described repeatedly here.

(Lamellar Structure)

Figure 5:
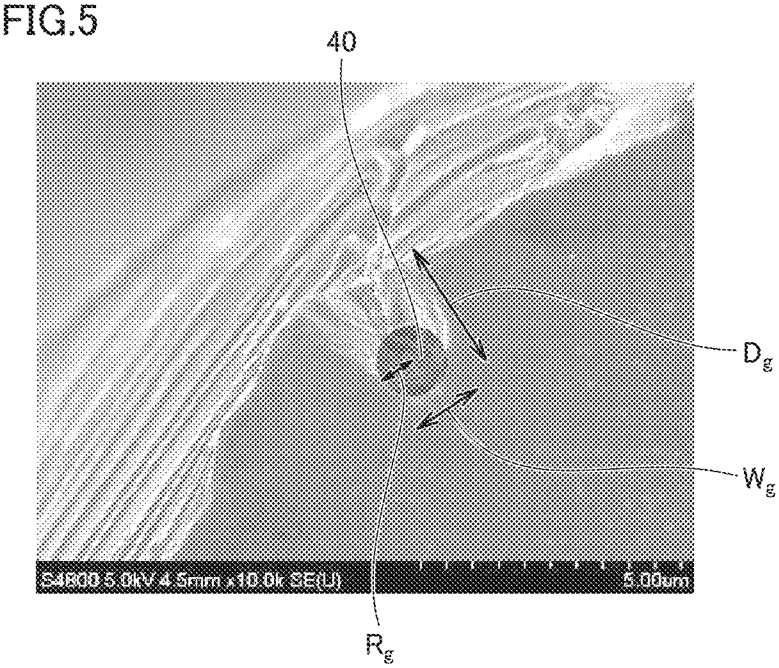
FIG. 5 shows an electron microscope photograph showing an exemplary cross section of a certain groove existing in a certain processed surface of the TiAl alloy impeller according to the present disclosure.
Figure 6:
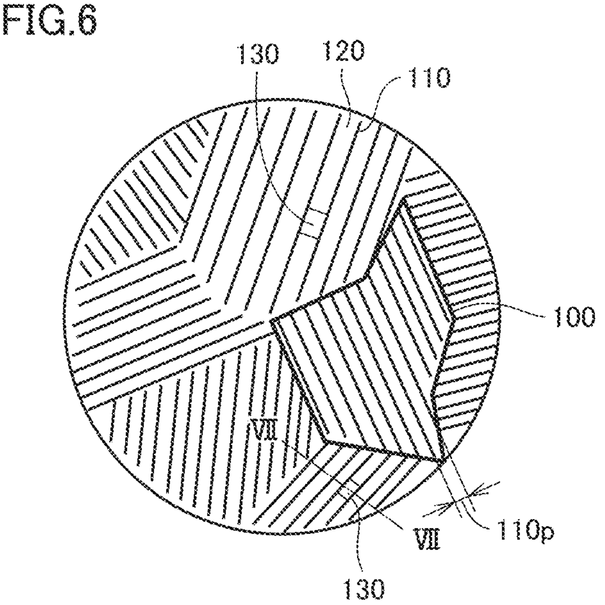
FIG. 6 is a schematic view showing an exemplary lamellar structure of the TiAl alloy impeller according to the present disclosure.

Further, referring to FIGS. 5 and 6, the TiAl alloy of the TiAl alloy impeller 1 according to the second embodiment has a lamellar structure in which $\alpha_2$ layers 110 each containing $Ti_3Al$ and γ layers 120 each containing TiAl are alternately stacked. In such a lamellar structure, the thickness of each of the γ layers 120 is larger than the thickness of each of the $\alpha_2$ layers 110, and an $\alpha_2$-layer pitch 110*p* is about 0.04 μm or more and 7 μm or less.

In such a lamellar structure, one or more lamellar colonies 100 in each of which the as layers 110 and the γ layers 120 are stacked in the same stacking direction are formed. The stacking direction is different between one lamellar colony and another lamellar colony adjacent thereto. At least one lamellar colony 100 exists in the surface of the TiAl alloy impeller 1 according to the second embodiment, FIG. 6 shows a state in which a cross section of the stacked layers of the plurality of lamellar colonies 100 in the lamellar structure is exhibited in the surface thereof, but a main surface of an $\alpha_2$ layer and/or a main surface of a $\gamma$ layer of a lamellar colony may be exhibited in the surface thereof. That is, the stacking direction in each lamellar colony 100 is three-dimensionally random.

(Groove)

Figure 7:
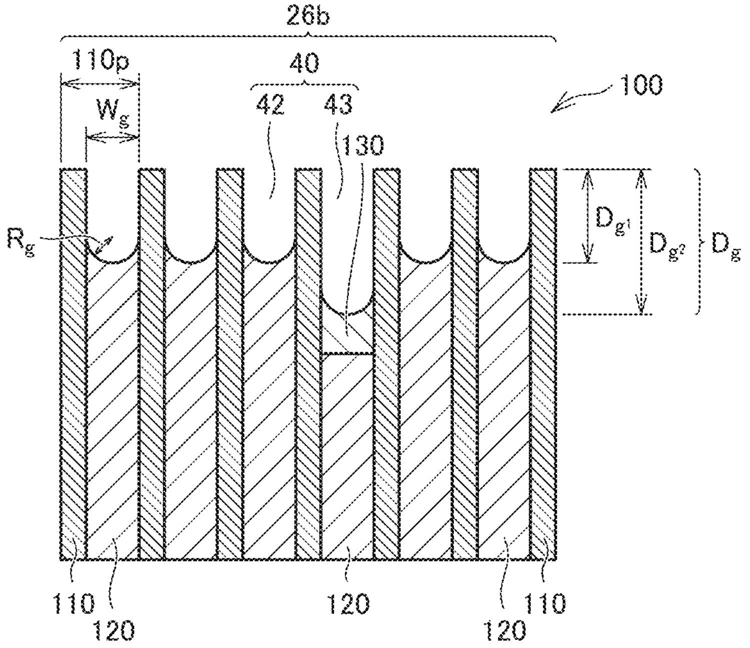
FIG. 7 is a schematic view showing an exemplary cross section of certain grooves existing in a certain processed surface of the TiAl alloy impeller according to the present disclosure along a line VII-VII of FIG. 6.

Referring to FIGS. 5 to 7, the processed surface **26*b* is provided with one or more grooves 40. That is, the one or more grooves 40 are formed in the processed surface 26*b*. The grooves 40 are originated from the lamellar structure described above. When the electrolytic processing is performed onto the shaped material having its surface in which the cross section of the stacked layers in the lamellar structure is exhibited, the $\gamma$ layers 120 each containing TiAl is promoted to be etched as compared with the as layers 110 each containing $Ti_3Al$, with the result that the grooves 40 are formed in the processed surface 26*b*. In the TiAl alloy impeller 1 according to the second embodiment, at the time of exhaustion of the gas, foreign matters in the exhaust gas are retained in the one or more grooves 40 formed in the processed surface 26*b* to make the processed surface 26*b*** smooth, thereby improving the exhaust efficiency, the fuel efficiency, and the like.

Due to the above-described origin of the grooves 40, the shape of each of the grooves 40 is an elongated strip shape when viewed from the processed surface 26 side (see FIG. 6), and a bottom portion of the groove 40 is a part (substantially circular arc) of a substantial circle and side portions of the groove 40 are substantially in parallel in a cross section thereof when viewed in a direction perpendicular to the processed surface **26*b* and perpendicular to the stacking direction in the lamellar structure (see FIG. 7). It should be noted that depending on a condition for the electrolytic processing, in the cross sectional shape of the groove 40**, the bottom portion may have a curved shape close to a substantially straight line, rather than the part of the substantial circle.

At least one of the grooves 40 (preferably at least half of the grooves 40, and more preferably all of the grooves 40) satisfies: i) a relation of $D_g>2\times R_g$, where $D_g$ represents a depth of the groove and $R_g$ represents a curvature radius of the groove at the bottom surface of the groove; or ii) a relation of $D_g>W_g$, where $D_g$ represents the depth of the groove and $W_g$ represents a width of the groove. The relation i) is used when the curvature radius of the groove 40 at the bottom surface of the groove 40 can be measured, whereas the relation ii) is used when the width of the groove 40 can be measured. Here, the depth $D_g$ of the groove 40 means a distance from an end surface of the $\alpha_2$ layer exhibited in the surface of the processed surface **26*b* to the deepest portion of the groove 40, and is measured by CT scan, a microscope, an SEM, or the like. Further, the curvature radios $R_g$ of the groove 40 at the bottom surface of the groove 40 is measured by CT scan, a microscope, an SEM, or the like, assuming that the curvature radius $R_g$ is equal to the radius of an equivalent-area circle tangential to a curve representing the bottom surface of the groove 40 in the cross section of the groove 40 (cross section perpendicular to the processed surface 26*b* and perpendicular to the stacking direction in the lamellar structure). The width $W_g$ of the groove 40 means a distance from one side surface of the groove to the other side surface thereof opposite thereto, and is measured by CT scan, a microscope, an SEM, or the like. In the TiAl alloy impeller according to the second embodiment, since at least one of the grooves 40 formed in the processed surface 26*h* satisfies the relation i) or ii), at the time of exhaustion of the gas, a large amount of foreign matters in the exhaust gas are retained in the grooves 40 to make the processed surface 26*b*** smooth, thereby improving the exhaust efficiency, the fuel consumption, and the like.

The width of each of the grooves 40 is not particularly limited, but it is preferable that iii) an average of the values twice as large as the respective curvature radii of the grooves 40 at the bottom surfaces of the grooves 40 is 0.04 μm or more and 7 μm or less or iv) an average of the widths of the grooves 40 is 0.04 μm or more and 7 μm or less, because such grooves are readily obtained by the process of formation of the grooves. From the viewpoint of retaining a large amount of fine foreign matters, each of the averages is more preferably 0.1 μm or more, and is further preferably 0.3 μm or more. From the viewpoint of retaining a large amount of foreign matters without missing out fine foreign matters, each of the averages is more preferably 5 μm or less, and is further preferably 3 μm or less. Here, the average of the values twice as large as the respective curvature radii of the grooves 40 at the bottom surfaces of the grooves 40 and the average of the widths of the grooves 40 respectively mean the average of the values twice as large as the respective curvature radii of the grooves at the bottom surfaces of the grooves and the average of the widths of the grooves when the number of the grooves is 1 to 10, and respectively mean the average of the values twice as large as the respective curvature radii of freely selected 10 grooves at the bottom surfaces of the freely selected 10 grooves and the average of the widths of the freely selected 10 grooves when the number of the grooves is more than 10.

The lengths of the grooves 40 are not particularly limited and can be widely within a range of the sizes (generally, about 5 μm or more and 1500 μm or less) of the lamellar colonies in the TiAl alloy because such grooves are readily obtained by the process of formation of the grooves.

As described above, each of the grooves 40 is formed due to the $\gamma$ layer 120 containing TiAl being etched more greatly than the $\alpha_2$ layer 110 containing $Ti_3Al$ when the electrolytic processing is performed onto the surface in which the cross section of the stacked layers in the lamellar structure is exhibited. Therefore, in the groove 40, the bottom surface of the groove 40 includes a $\gamma$ layer groove portion 42 that is an end surface of the $\gamma$ layer 120.

In the TiAl alloy impeller 1 according to the second embodiment, the TiAl alloy may contain a St-based compound 130 (see FIG. 6). In such a case, the Si-based compound 130 is contained in a $\gamma$ layer 120 of the lamellar structure. The Si-based compound 130 contained in the $\gamma$ layer 120 is detected by an SEM-EDX (energy dispersive X-ray spectroscopy apparatus) and/or EPMA (electron probe microanalyzer). Since the Si-based compound 130 is etched more greatly than the $\gamma$ layer 120 when the electrolytic processing is performed onto the surface in which the cross section of the stacked layers in such a lamellar structure is exhibited, the bottom surface of the groove 40 further includes a Si-based groove portion 43 that is an end surface of the Si-based compound 130, and for each groove 40 including the $\gamma$ layer groove portion 42 and the Si-based groove portion 43, a relation of $D_{g1}<D_{g2}$ can be satisfied, where $D_{g1}$ represents a depth of the $\gamma$ layer groove portion 42 and $D_{g2}$ represents a depth of the Si-based groove portion 43 (see FIG. 7). Here, the depth $D_{g1}$ of the $\gamma$ layer groove portion 42 means a distance from the end surface of the $\alpha_2$ layer exhibited in the surface of the processed surface **26*b* to the deepest portion of the $\gamma$ layer groove portion 42. The depth $D_{g2}$ of the Si-based groove portion 43 means a distance from the end surface of the $\alpha_2$ layer exhibited in the surface of the processed surface 26*b* to the deepest portion of the Si-based groove portion 43. Further, a method of measuring each of the depths $D_{g1}$ and $D_{g2}$ is the same as the method of measuring the depth $D_g$. Since such a TiAl alloy impeller is provided with the grooves having different depths in the processed surface 26***b*, at the time of exhaustion of the gas, a large amount of foreign matters in the exhaust gas are retained in the grooves 40 to make the processed surface 26*b* smooth, thereby improving the exhaust efficiency, the fuel efficiency, and the like.

(Manufacturing Method)

Referring to FIGS. 1, 2, and 8, the TiAl alloy impeller 1 according to the second embodiment is obtained by performing the electrolytic processing onto the region of the blade 20 including the outer edge 21 in the shaped material 2 having its surface in which the cross section of the stacked layers in the lamellar structure is exhibited.

Third Embodiment

Referring to FIGS. 1 and 2, as with each of the TiAl alloy impellers according to the first and second embodiments, a TiAl alloy impeller 1 according to a third embodiment is composed of a TiAl alloy and is mountable on a vehicle turbocharger, specifically includes a shaft portion 10 and a plurality of blades 20 connected to the shaft portion 10, and the shaft portion 10 and the plurality of blades 20 are formed in one piece. Further, as with each of the Ti alloy impellers according to the first and second embodiments, each of the blades 20 of the TiAl alloy impeller according to the third embodiment includes an outer edge 21 that is an edge on an outer side in the radial direction of the shaft portion 10, and a region of each of the blades 20 including the outer edge 21 has a processed surface 26*b*. Thus, the shaft portion 10, the blades 20, and the processed surface 26*b* in the TiAl alloy impeller 1 according to the third embodiment are the same as the shaft portion 10, the blades 20, and the processed surface 26*b* in each of the TiAl alloy impellers according to the first and second embodiments, and therefore will not be described repeatedly here.

Further, in the TiAl alloy impeller according to the third embodiment, as with the TiAl alloy impeller according to the first embodiment, the processed surface 26*b* is provided with one or more holes 30 and at least one of the holes 30 (preferably at least half of the holes 30, and more preferably all of the holes 30) satisfies a relation of $D_h \leq 2 \times R_h$, where $D_h$ represents a depth of the hole 30 and $R_h$ represents a curvature radius of the hole 30 at a bottom surface of the hole 30. Thus, the bole 30 and the relation of $D_h \leq 2 \times R_h$ in the TiAl alloy impeller according to the third embodiment are the same as the hole 30 and the relation of $D_h \leq 2 \times R_h$ in the TiAl alloy impeller according to the first embodiment, and therefore will not be described repeatedly here.

Further, as with the TiAl alloy impeller according to the second embodiment, in the TiAl alloy impeller according to the third embodiment, the processed surface 26*b* is provided with one or more grooves 40 and at least one of the grooves 40 (preferably at least half of the grooves 40, and more preferably all of the grooves 40) satisfies a relation of $D_g > 2 \times R_g$ or $D_g > W_g$, where $D_g$ represents a depth of the groove 40 and $R_g$ represents a curvature radios of the groove 40 at a the bottom surface of the groove 40 or $W_g$ represents a width of the groove. Thus, the groove 40 and the relation of $D_g > 2 \times R_g$ or $D_g > W_g$ in the TiAl alloy impeller according to the third embodiment are the same as the groove 40 and the relation of $D_g > 2\lambda R_g$ or $D_g > W_g$ in the TiAl alloy impeller according to the second embodiment, and therefore will not be described repeated here.

(Existence of Both Holes and Grooves)

The TiAl alloy impeller 1 according to the third embodiment is provided with the one or more holes 30 and the one or more grooves 40. Therefore, at the time of exhaustion of the gas, various foreign matters in the exhaust gas are retained in the holes 30 and the grooves 40 of the processed surface 26*b* to make the processed surface 26*b* smoother, thereby further improving the exhaust efficiency, the fuel efficiency, and the like.

The sizes of each hole 30 and each groove 40 of the TiAl alloy impeller 1 according to the third embodiment are not particularly limited, but the average diameter of the holes 30 is preferably 500 μm or less and the average of the values twice as large as the respective curvature radii of the grooves 40 at the bottom surfaces of the grooves 40 or the average of the widths of the grooves 40 is preferably 0.04 μm or more and 7 μm or less because such holes and such grooves are readily obtained by the process of formation of the holes 30 and the grooves 40. Since the processed surface 26*b* of such a TiAl alloy impeller 1 is provided with the holes 30 falling within the above-described range and the grooves 40 for which the average of the values twice as large as the respective curvature radii or the average of the widths thereof falls within the above-described range, foreign matters having various sizes within the above-described ranges in the exhaust gas are retained in the holes 30 and the grooves 40 of the processed surface 26*b* at the time of exhaustion of the gas to make the processed surface 26*b* smoother, thereby further improving the exhaust efficiency, the fuel efficiency, and the like.

In the TiAl alloy impeller 1 according to the third embodiment, the average of the values twice as large as the respective curvature radii of the grooves 40 or the average of the widths of the grooves 40 is preferably smaller than the average diameter of the holes 30. Since the processed surface 26*b* of such a TiAl alloy impeller is provided with the boles 30 for which the average diameter thereof is relatively large and the grooves 40 for which the average of the values twice as large as the respective curvature radii thereof at the bottom surfaces or the average of the widths thereof are relatively small, foreign matters having various sizes within the above-described ranges in the exhaust gas are retained in the holes 30 and the grooves 40 of the processed surface 26*b* at the time of exhaustion of the gas to make the processed surface 26*b* smoother, thereby further improving the exhaust efficiency, the fuel consumption, and the like.

(Manufacturing Method)

Referring to FIGS. 1, 2, and 8, since the TiAl alloy impeller 1 according to the third embodiment is provided with both the holes 30 in the TiAl alloy impeller according to the first embodiment and the grooves 40 in the TiAl alloy impeller according to the second embodiment, the TiAl alloy impeller 1 according to the third embodiment is obtained by performing the electrolytic processing onto the shaped material 2 that has its surface and inner portion provided with the pores and that has its surface in which the cross section of the stacked layers in the lamellar structure is exhibited.

EXAMPLES

1. Production of TiAl Alloy Impeller

Referring to FIG. 8, as the shaped material 2 of the TiAl alloy impeller, a cast product was prepared by casting DAT-TA2, which is a TiAl alloy provided by Daido Steel, into a predetermined shape. Here, a representative component composition of DAT-TA2 is as follows: 31.8 mass % of Al, 7.5 mass % of Nb, 1.0 mass % of Cr, 0.5 mass % of Si, 0.03 mass % of C, less than 0.1 mass % of O, and a remainder of Ti. Next, electrolytic processing was performed onto a whole of the protruding surface 26 of the blade 20 including the outer edge 21 in the shaped material 2, thereby producing a TiAl alloy impeller such as the one shown in FIG. 1. Conditions for the electrolytic processing on the shaped material 2 were as follows: a distance between the protruding surface of the blade and an electrode was 0.6 mm; an ECM current was 35 A (per blade); a processing time was 125 seconds; an electrolytic liquid was a 17 mass % $NaNO_3$ aqueous solution; an electrolytic liquid jetting amount (upper nozzle) was 1.25 L/min; and an electrolytic liquid jetting amount (side nozzle) was 1.25 L/min.

2. Evaluations on Characteristics of TiAl Alloy Impeller

Figure 3:
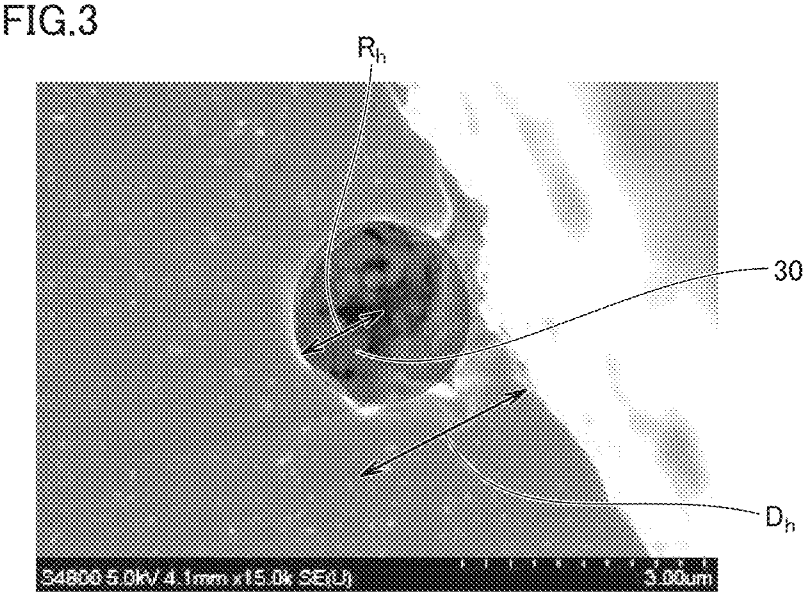
FIG. 3 shows an electron microscope photograph showing an exemplary cross section of a certain hole existing in a certain processed surface of the TiAl alloy impeller according to the present disclosure.

When the processed surface 26*b* of the TiAl alloy impeller obtained as described above and its cross section (cross section perpendicular to the processed surface and perpendicular to the stacking direction in the lamellar structure) were observed using an SEM (S-4800 provided by Hitachi High-Tech Corporation), a multiplicity of holes 30 each as shown in FIG. 3 and a multiplicity of grooves 40 each as shown in FIG. 5 were observed. The depths $D_h$ of 10 holes freely selected from the multiplicity of holes observed and the curvature radii $R_h$ of the 10 boles at the bottom surfaces of the 10 holes were measured by the SEM (S-4800 provided by Hitachi High-Tech Cooperation) so as to confirm whether or not the relation of $D_h \leq 2 \times R_h$ was satisfied, and the average diameter of the boles was found. Further, the depths $D_h$ of 10 grooves freely selected from the multiplicity of grooves observed, the curvature radii $R_g$ of the 10 grooves at the bottom surfaces of the 10 grooves, and the widths $W_g$ of the 10 grooves were measured using the SEM (S-4800 provided by Hitachi High-Tech Cooperation) so as to confirm whether or not the relation of $D_g > 2 \times R_g$ was satisfied and whether or not the relation of $D_g > W_g$ was satisfied, and the average of the values twice as large as the respective curvature radii of the grooves at the bottom surfaces of the grooves and the average of the widths of the grooves were found. For the 10 holes, the relation of $1.75 \times R_h \leq D_h \leq 2 \times R_h$ was satisfied and the average diameter of the holes was 2.40 μm. Moreover, for the 10 grooves, the relation of $D_g > 2 \times R_g$ and the relation of $D_g > W_g$ were satisfied and the average of the values as twice as the curvature radii of the grooves at the bottom surfaces of the grooves and the average of the widths of the grooves were each 2.07 μm. Further, among the 10 grooves, there were 3 grooves each including both the γ layer groove portion and the Si-based groove portion (it was confirmed by an SEM-EDX (in which an EDX X-MAX N80 provided by Horiba is attached onto S-4800 provided by Hitachi High-Tech Cooperation) that the bottom surface was the Si-based compound), and the relation of $D_{g1} < D_{g2}$ was satisfied with regard to the depth $D_{g1}$ of the γ layer groove portion and the depth $D_{g2}$ of the Si-based groove portion in each of the three grooves. It should be noted that a detailed distribution state of the Si-based compound in the TiAl alloy impeller was confirmed by an EPMA (EPMA-8050G provided by Horiba). That is, the TiAl alloy impeller obtained in the present example corresponds to the TiAl alloy impeller according to the third embodiment.

The embodiments disclosed herein are illustrative and non-restrictive in any respect. The scope of the present disclosure is defined by the terms of the claims, rather than the embodiments described above, and further includes any modifications within the scope and meaning equivalent to the terms of the claims.

REFERENCE SIGNS LIST

1: TiAl alloy impeller
2: shaped material
10: shaft portion
12: disc portion
20: blade
21: outer edge
22: one-side edge
24: recess
24*x*: cast surface
26: protrusion
26*a*: cast surface
26*b*: processed surface
30: hole
40: groove
42: γ layer groove portion
43: Si-based groove portion
100: lamellar colony
110: $\alpha_2$ layer
110: $\alpha_2$-layer pitch
120: γ layer
130: Si-based compound
A: rotation axis

The invention claimed is:

1. A TiAl alloy impeller composed of a TiAl alloy and mountable on a vehicle turbocharger, wherein the TiAl alloy has a lamellar structure in which an $\alpha_2$ layer containing $Ti_3Al$ and a γ layer containing TiAl are alternately stacked and contains a Si-based compound, the Si based compound is contained in the γ layer, the TiAl alloy impeller comprising a shaft portion and a plurality of blades connected to the shaft portion, wherein each of the plurality of blades includes an outer edge that is an edge on an outer side in a radial direction of the shaft portion, a region of each of the plurality of blades including the outer edge has a processed surface, the processed surface is provided with one or more grooves, at least one of the one or more grooves includes a γ layer groove portion that is an end surface of the γ layer and a Si-based groove portion that is an end surface of the Si-based compound, at least one of the one or more grooves satisfies a relation of $D_g > 2 \times R_g$ or $D_g > W_g$, where $D_g$ represents a depth of the at least one of the one or more grooves and $R_g$ represents a curvature radius of the groove at a bottom surface of the at least one of the one or more grooves or $W_g$ represents a width of the at least one of the one or more grooves, and for each groove including the γ layer groove portion and the Si-based groove portion, a relation of Dg1<Dg2 is satisfied, where Dg1 represents a depth of the γ layer groove portion and Dg2 represents a depth of the Si-based groove portion.

2. The TiAl alloy impeller according to claim 1, wherein an average of the values twice as large as the respective curvature radii of the one or more grooves or an average of the widths of the one or more grooves is 0.04 μm or more and 7 μm or less.

3. The TiAl alloy impeller according to claim 1, wherein the shape of each of the one or more grooves is an elongated strip shape when viewed from the processed surface side.

4. The TiAl alloy impeller according to claim 1, wherein the lengths of the one or more grooves are 5 μm or more and 1500 μm or less.

5. A TiAl alloy impeller composed of a TiAl alloy and mountable on a vehicle turbocharger, wherein the TiAl alloy has a lamellar structure in which an $\alpha_2$ layer containing $Ti_3Al$ and a γ layer containing TiAl are alternately stacked and contains a Si based compound, the Si based compound is contained in the γ layer, the TiAl alloy impeller comprising a shaft portion and a plurality of blades connected to the shaft portion, wherein each of the plurality of blades includes an outer edge that is an edge on an outer side in a radial direction of the shaft portion, a region of each of the plurality of blades including the outer edge has a processed surface, the processed surface is provided with one or more holes and one or more grooves, at least one of the one or more holes satisfies a relation of $D_h \leq 2\times R_h$ and $W_{hs} < W_h$, where $D_h$ represents a depth of the at least one of the one or more holes, $R_h$ represents a curvature radius of the at least one of the one or more holes, at a bottom surface of the at least one of the one or more holes, $W_{hs}$ represents a processed-surface diameter that is a diameter of the at least one of the one or more holes in the processed surface and $W_h$ represents a diameter of the at least one of the one or more holes defined as $2\times R_h$ at least one of the one or more grooves includes a γ layer groove portion that is an end surface of the γ layer and a Si-based groove portion that is an end surface of the Si-based compound, at least one of the one or more grooves satisfies a relation of $D_g > 2\times R_g$ or $D_g > W_g$, where $D_g$ represents a depth of the at least one of the one or more grooves and $R_g$ represents a curvature radius of the groove at a bottom surface of the at least one of the one or more grooves or $W_g$ represents a width of the at least one of the one or more grooves, and for each groove including the γ layer groove portion and the Si-based groove portion, a relation of $Dg1 < Dg2$ is satisfied, where Dg1 represents a depth of the γ layer groove portion and Dg2 represents a depth of the Si-based groove portion.

6. The TiAl alloy impeller according to claim 5, wherein an average diameter of the one or more holes is 500 μm or less, and an average of the values twice as large as the respective curvature radii of the grooves or an average of the widths of the one or more grooves is 0.04 μm or more and 7 μm or less.

7. The TiAl alloy impeller according to claim 5, wherein an average of the values twice as large as the respective curvature radii of the one or more grooves or an average of the widths of the grooves is smaller than an average diameter of the holes.

8. The TiAl alloy impeller according to claim 5, wherein the shape of each of the one or more grooves is an elongated strip shape when viewed from the processed surface side.

9. The TiAl alloy impeller according to claim 5, wherein the lengths of the one or more grooves are 5 μm or more and 1500 μm or less.

* * * * *